United States Patent [19]

Meny et al.

[11] 4,227,899
[45] Oct. 14, 1980

[54] ABSOLUTE FLUID FILTER

[76] Inventors: Allan H. Meny, 1 Hoover St., North Arlington, N.J. 07032; Dennis L. Palmer, 61 Douglas Dr., Towaco, N.J. 07082

[21] Appl. No.: 939,972

[22] Filed: Sep. 6, 1978

[51] Int. Cl.³ .............................................. B01D 39/16
[52] U.S. Cl. ...................................... 55/279; 55/524; 55/528; 55/360
[58] Field of Search ................. 55/524, 527, 528, 279, 55/360; 131/267; 428/283, 290; 260/42.46; 210/506–509

[56] References Cited

U.S. PATENT DOCUMENTS

| Re. 29.410 | 9/1977 | Yoshino | 55/524 |
|---|---|---|---|
| 2,430,861 | 11/1947 | Carpenter et al. | 55/524 |
| 2,527,678 | 10/1950 | Francis, Jr. | 55/524 |
| 2,566,960 | 9/1951 | Philipps | 55/524 |
| 2,785,090 | 3/1957 | Kirk, Jr. | 55/524 |
| 2,839,158 | 6/1958 | Reinauer | 55/524 |
| 2,871,977 | 2/1959 | Kling | 55/524 |
| 2,932,362 | 4/1960 | Roper | 55/524 |
| 3,015,367 | 1/1962 | Smith et al. | 131/267 |
| 3,320,961 | 5/1967 | Hughes et al. | 131/267 |
| 3,594,993 | 7/1971 | Heyse | 55/524 |
| 3,755,519 | 8/1973 | Myers et al. | 260/42.46 |
| 4,097,656 | 6/1978 | Dany et al. | 260/42.46 |

FOREIGN PATENT DOCUMENTS

| 247368 | 1/1963 | Australia | 260/42.46 |
|---|---|---|---|
| 109573 | 9/1971 | Japan | 55/524 |
| 109372 | 3/1975 | Japan | 428/290 |
| 966854 | 8/1964 | United Kingdom | 55/524 |

*Primary Examiner*—David L. Lacey
*Attorney, Agent, or Firm*—Thomas N. Neiman

[57] ABSTRACT

The novel filter, according to an embodiment thereof, comprises a filter matrix formed into a specific geometry and made of glass, metal, mineral and/or cellulostic fibers, or fibers or fiber-agglomerates molded from thermoplastic, thermoset plastic, elastoplasts, or related synthetic polymer materials, which have been coated, impregnated, or compounded, prior to forming, with a series of substances in order that the filter may be easily cleaned and reused, as well as protected against corrosive action by the fluid media, or to render substances in the filtration fluid media chemically unreactive, or to change the chemical state or structure of matter in the fluid media. The coating compounds, filler compounds, or impregnants, depending upon which thereof are employed, change the physical properties of the filter matrix and alters impaction-retention of filtered particles, and/or alters the electrostatic attraction of the matrix for matter in the fluid media, and/or imparts corrosion protection to the filter matrix, and/or renders matter in the fluid media chemically unreactive by changing its reactivity characteristics or chemical structure upon contact with the matrix.

8 Claims, No Drawings

ABSOLUTE FLUID FILTER

This invention pertains to fluid filters for removing components such as particulate matter from gas streams, and in particular to an improved fluid filter of the absolute type.

Absolute filters, especially HEPA filters, are of uncommon efficiency for removing components such as particulate materials, particulate-aerosol combinants, sublimated solids, vapors, bacteria and virus, some real gases, and the like, from gas streams. However, filters of this type are uncommonly expensive and this fact, together with the impossibility of cleaning such filters for reuse, makes them economically unattractive. Such filters experience an overly efficient particulate impaction-retention, electrostatic attraction, and adhesion to the filter matrix that causes the filter to build up particulate matter, "blinding" the filter system, thus causing a severe gas stream pressure drop and loss of gas media through-out. If mechanical energy is added to the filter system to free the matrix of accumulated particulates, the energy has to be of such magnitude that it will lead to physical damage of the filter material or the structure of the filter matrix. In most cases, without damaging the filter, it cannot be rendered reusable.

It is an object of this invention to set forth an improved absolute, fluid filter which has been rendered easily and non-destructively cleanable and, hence, reusable.

It is particularly an object of this invention to set forth an improved absolute, fluid filter, for removing components such as particular materials, particulate-aerosol combinants, sublimated solids, and the like, from gas streams, said filter having a matrix formed from a material taken from a group consisting of treated cellulose, glass, metal, and mineral fibers, fiber laminates, and synthetic polymer fibers which have been treated, filled or the like, wherein the improvement comprises means mated to said matrix material for facilitating release of said stream components from said filter, to render said filter easily and non-destructively cleanable, as aforesaid, whereby said filter, upon having been cleaned pursuant to a blinded condition thereof, manifests a change in pressure drop across the filter face which manifests restoration to fifty percent of the used or blinded condition pressure drop. For example, if the filter has a pressure drop of 1.5 inches of water at 1000 cfm of air at STP across a filter with a face area of 500 in.$^2$ and, with use, develops a pressure drop of 5 to 15 inches of water at the same condition and blinds, the filter should have to be cleaned to fifty percent of the blinded condition pressure drop, i.e. 2.5 or 7.5 inches of water, for the filter to be considered as having been rendered reusable. It is the aforesaid object of this invention, then, to disclose an improved absolute, fluid filter which can be rendered reusable.

It is another object of this invention to disclose an improved absolute, fluid filter, as aforesaid, wherein said mated means further comprises means for selectively altering physical properties of said matrix material to reduce impaction-retention of said stream components captured by said matrix material, while maintaining filtration efficiency of said filter, and rendering said filter easily and non-destructively cleanable and realizing said pressure condition thereacross as noted.

It is another object of this invention to teach an improved absolute, fluid filter, of the type noted, in which said mated means further comprises means for reducing electrostatic attraction of said matrix material for stream components captured by said matrix material.

It is another object of this invention to set forth an improved absolute, fluid filter, of the type noted, in which said mated means further comprises means for increasing diffusion capacity of said matrix material while maintaining in the latter accessible apertures or paths from where stream components captured by said matrix material can be easily removed without damage to the matrix system and, physically, to bring said filter to said fifty percent (approximately) pressure condition.

It is yet another object of this invention to disclose an improved absolute, fluid filter, according to the foregoing, in which said mated means further comprises means for protecting said matrix material from corrosive action of said stream components, or from damage arising from gross impingement, abrasion, or erosion.

It is still a further object of this invention to teach an improved absolute, fluid filter, as noted in the foregoing, in which said mated means further comprises means for rendering said stream components unreactive, non-carcinogenic, or likewise chemically stable, due to reaction of said components with said mated means, wherein said mated means comprises means for functioning as a gettering agent, and wherein said mated means comprises means for altering the chemical structure or chemical state, functionality, or reactivity of the stream components.

Further objects of this invention, as well as the novel features thereof, will become more apparent by reference to the following description.

Fluid filters, especially absolute filters of the HEPA type, defined as superinterception apparatus, and so-called "absolute" because of their extremely high retention characteristics and their ability to remove the very smallest particles and the like from gas streams, manifest both *impaction* and *diffusion*. In impaction, the to-be-filtered-out components collide with filter matrix fibers and are held—particularly because the fiber surfaces are relatively light and soft, and they readily accept the components. In diffusion, the components in the gas stream migrate from a region of high component concentration to the regions of lower concentrations, and "diffuse" from the latter to the former to accumulate on the fibers. Now, this phenomena, taken with the electrostatic attraction of the fibers for the components, causes the components to cling tenaciously to the fibers. The impaction-retained components tend to be the larger thereof, whereas the diffused and electro-statically-held components are typically the smaller.

As noted previously, to effect release of the captured or entrapped components, it is the customary practice to add mechanical energy to the filter system. To release the components, a sufficient amount of energy must be added to overcome the combined impaction-retention/diffusion/electro-static forces. Untreated filters must be energized with mechanical forces that will exceed the strength of the fibers of the matrix, or the fiber-agglomerates, and the filter itself, causing destruction of the filter system. This being the state-of-the-art condition for filter systems, it is our invention to coat, formulate constituents into, or impregnate the filter matrix material with one or more materials which impart singular component release, favorably alter the physical properties of the matrix material fibers, positively control the electro-static forces of attraction for the gas stream components and accommodate the egress of captured components by providing accessible apertures or paths from whence stream components can be easily removed. In addition, the coating materials, formulated constituents, or impregnants can simultaneously provide corrosion protection to the filter matrix material to render the gas stream components harmless, or simultaneously getter certain carcinogenics or chemically unstable substances by altering their chemical reactivity or by changing their chemical structure.

According to one embodiment of the invention, a coating material comprising a mixture of graphitic powders of varing particle-size distributions in various thermoplastic and thermoset plastic matrix systems is used. This material is available commerically, under the name EPIS coating, from Epis Corporation, 70 Oakwood Drive, Glastonbury, Connecticut 06033. The coating is pressure sprayed onto one side of the filter media or matrix and drawn by vacuum on the side opposite. The coating is then allowed to reside in the filter matrix, with the spray turned off and with the vacuum on, for a period of time ranging from one to sixteen hours. The coating may be annealed or sintered after the aforesaid fluidizing treatment. According to one of our curing techniques, the matrix is air dried with 250° F. air venting to the atmosphere, for from one to ten hours. Next, the heat is raised to 450° F., this being held for from one to sixteen hours. Finally, the filter matrix is allowed to cool to room temperature. The coating finishes as a homogeneous, hard film on the fibers of the filter matrix of from 10 to 1000 microns thickness, approximately.

The foregoing treatment reduces the resistivity of the filter matrix media from $10^{-10}$ to $10^{-13}$ ohm-cm (dry) to $10^{-4}$ to $10^{-1}$ ohm-cm depending on the composition of the coating and the thickness thereof. Coatings of this type, when formulated and applied as noted, also impart unusual corrosion resistance to the filter media because of the coating's ability to resist oxidation attack, organic-vapor solvent stress, corrosion cracking, caustic attack, inorganic gaseous attack, or salvation/dissolution attack from chlorinated hydrocarbons, or halogenated acids such as hydrofluoric acid (or hydrogen fluoride). Coating formulations which are useful for realizing the objects of this invention are set out in Table 1.

TABLE 1

| Coating Solution Solute | Composition of the Coating Prior to Coating Application and Cure (Weight/Percent) | Our Formulation Designation |
|---|---|---|
| Sodium Meta Silicate ($Na_2SiO_3 \cdot 9 H_2O$) | 0.5 to 85 in $H_2O$ | SMS-1 |
| Polymethyl siloxane (silicone) | 0.5 to 85 in Toluene, cyclohexane, or chlorinated hydrocarbons or water-solvent emulsion or flame sprayed | PMS-1 |
| Polymethyl vinyl siloxane (silicone) | 0.5 to 85 in Toluene, cyclohexane, or chlorinated hydrocarbons or water-solvent emulsion flame sprayed | PVS-1 |
| Polyphenyl methyl siloxane (silicone) | 0.5 to 85 (in same, as above) | PPMS-1 |
| Polytetrafluoroethylene | 0.5 to 50 in a water emulsion or applied in a fluidized bed or electro-static process as neat material, flame sprayed | TFE-1 |
| Polymethylmethacrylate (acrylic) | 0.5 to 85 in ketones, alcohols, freons, glycol ethers (cellusolves, etc.) or chlorinated hydrocarbons (CH)* or as a water emulsion | PMMA-1 |
| Polyacrylic acid (acrylic acid) | 0.5 to 85 in Tetrahydrofuran (THF) N,N-Dimethyl formamide (NNDF) as a water solution | PAA-1 |
| Acrylonitrile-butadiene Polystyrene (ABS) | 0.5 to 85 in ketones, cyclohexane, NNDF, THF, or as a water-solvent emulsion | ABS-1 |
| Alkyd polymers (alkyd) | 0.5 to 85 in ketones, THF, 1,1,1, 3,3,3,Hexafluoro-2-propanol (HFP) or as a water-solvent emulsion | AP-1 |
| Polyamides (nylons, nylon 11, nylon 6/6, nylon 6/10, nylon-6, nylon-12) | 0.5 to 85 in NNDF, HFP, THF, toluenes or as a water-solvent emulsion or flame sprayed or fluidized bed or electro-statically coated | PA-1 |
| Polyamides (Vespels) | 0.5 to 85 in NNDF, HFP, THF, toluene, or as a water-solvent emulsion, flame spray, fluidized bed or electro-statically coated | PI-1 |
| Cellulosics (cellulose nitrate, acetate butyrate, ethyl cellulose modified with urea, alkyd and other resins) | 0.5 to 85 in ketones, esters, aromatic solvents, THF, NNDF, electrostatic powder techniques | C-1 |
| Epoxy polymers (glycidyl ethers of bis-hydroxylphenyl propane catalyzed with mono- di-, or trifunctional amines or phenolic or amino resins) | 0.5 to 85 in THF, chlorinated hydrocarbons electro-static or flame spray or fluidized bed | EP-1 |
| Polyfluoroethylene propylene | 0.5 to 85 in a water emulsion, or as a neat solid by high tem- | FEP-1 |

TABLE 1-continued

| Coating Solution Solute | Composition of the Coating Prior to Coating Application and Cure (Weight/Percent) | Our Formulation Designation |
|---|---|---|
| (FEP resins) | perature sintering | |
| Unsaturated Polyester (Linear alkyd having carbon to carbon unsaturation) | 0.5 to 85 in ketones, toluene, THF, chlorinated hydrocarbons, or as a water solvent emulsion | UE-1 |
| Polyphenylene sulfide RYTON | Fluidized bed, electro-static spray or flame sprayed | PPS-1 |
| Polyolefins (Polyethylene, polypropylene) | Flame spraying or fusion sintering or as a water suspension emulsion | POE-1 POP-1 |
| Chlorosulfonated polyethylene (HYPALON) | 0.5 to 85 in a water solvent emulsion system | CSPE-1 |
| Polyphenylene Oxides (VALOX) | 0.5 to 85 in NNDF or as a water solvent emulsion or flame sprayed, electro-statically coated, or fluidized bed | PPO-1 |
| Polycarbonates (LEXAN) | 0.5 to 85 in THF, chlorinated hydrocarbons or as a water solvent emulsion | PC-1 |
| Polysulfones | 0.5 to 85 in THF or chlorinated hydrocarbons, flame sprayed or fluidized bed application | PS-1 |
| Polyurethanes (polyether and polyester types) | 0.5 to 85 in Methylene chloride, THF, glycol ethers toluene, 100% solids spray or a water-solvent emulsion | PUES-1 PUET-1 |
| Sodium Silicate $Na_2O \cdot xSiO_2$ (x = 3-5) | 0.5 to 85 in a water solution of caustic | SS-2 |
| Sodium disilicate $Na_2Si_2O_5$ | 0.5 to 85 in a water solution | SS-3 |
| Sodium othosilicate $Na_4SiO_4$ | 0.5 to 85 in a water solution of caustic | SS-4 |
| Strontium orthosilicate $SrSiO_4$ | 0.5 to 85 in a water solution of caustic | SS-5 |
| Potassium metasilicate $K_2SiO_3 \cdot 6H_2O$ | 0.5 to 85 in water solution | WG-1 |
| Potassium tetrasilicate $K_2Si_4O \cdot 9H_2O$ | 0.5 to 85 in water | WG-2 |
| Lethuim Metasilicate $Li_2SiO_3 \cdot xH_2C$ (x=1 to n) | 0.5 to 85 in dilute hydrochloric acid | WG-3 |
| Calcium Metasilicate $CaSiO_3 \cdot xH_2O$ (x=1 to n) | 0.5 to 85 in dilute hydrochloric acid | WG-4 |
| Barium Metasilicate Hydrate ($BaSiO_3 \cdot 6H_2O$) | 0.5 to 85 in water | WG-5 |
| Polyparaxylene | Vapor deposited | PPX-1 |
| Organo, silane compounds (butyl-, tolyl-, properyl or similar analogue types) | 0.5 to 85 in solution of toluene, benzene or dioxane | OS-1 |

*See Table 3 for chemical names of solvents shown as abbreviations.

Alternatively, the foregoing coating compositions, which are not deemed to be exhaustive, may be filled with various agents to improve the performance of the filter matrix. In Table 2 which follows, preferred fillers for the coating compositions of Table 1 are listed. The compositions of Table 1, or those with the fillers of Table 2 may be used on the filter matrix fibers, or they may be impregnated into the matrix fibers; as to the latter, more follows in the ensuing text.

TABLE 2

| Metal/Non-Metallic Filler* | Range of Compositions | | |
|---|---|---|---|
| | Weight/Percent Composition | Weight/Percent Binder** | Weight/Percent Vehicle |
| Stainless steel powder | 0.1 to 25 | 0.3 to 10.0 | 99.6 to 65.0 |
| Silver plated on nickel | 0.1 to 25 | 0.3 to 10.0 | 99.6 to 65.0 |
| Silver plated on carbon | 0.1 to 25 | 0.3 to 10.0 | 99.6 to 65.0 |
| Silver plated on graphite | 01. to 25 | 0.3 to 10.0 | 99.6 to 65.0 |
| Iridium plated on graphite | 0.1 to 25 | 0.3 to 10.0 | 99.6 to 65.0 |
| Aluminum-zinc 40:60 | 0.1 to 25 | 0.3 to 10.0 | 99.6 to 65.0 |
| Chromium-nickel 55:45 | 0.1 to 25 | 0.3 to 10.0 | 99.6 to 65.0 |
| Copper chromium 99:1 | 0.1 to 25 | 0.3 to 10.0 | 99.6 to 65.0 |
| INCONEL 600 | 0.1 to 25 | 0.3 to 10.0 | 99.6 to 65.0 |
| Titanium-aluminum 65:35 | 0.1 to 25 | 0.3 to 10.0 | 99.6 to 65.0 |
| Zirconium-nickel 70:30 | 0.1 to 25 | 0.3 to 10.0 | 99.6 to 65.0 |
| Titanium carbide | 0.1 to 25 | 0.3 to 10.0 | 99.6 to 65.0 |
| Noury Ketjenblack-EC$^{(tm)}$ | 0.1 to 25 | 0.3 to 10.0 | 99.6 to 65.0 |
| Boron carbide | 0.1 to 25 | 0.3 to 10.0 | 99.6 to 65.0 |
| Columbium (niobium) carbide | 0.1 to 25 | 0.3 to 10.0 | 99.6 to 65.0 |

TABLE 2-continued

| Metal/Non-Metallic Filler* | Range of Compositions | | |
|---|---|---|---|
| | Weight/Percent Composition | Weight/Percent Binder** | Weight/Percent Vehicle |
| Tantalum carbide | 0.1 to 25 | 0.3 to 10.0 | 99.6 to 65.0 |
| Tungsten-titanium carbide | 0.1 to 25 | 0.3 to 10.0 | 99.6 to 65.0 |
| Zirconium carbide | 0.1 to 25 | 0.3 to 10.0 | 99.6 to 65.0 |
| Petroleum coke base carbon | 0.1 to 25 | 0.3 to 10.0 | 99.6 to 65.0 |
| Anthracite coal base carbon | 0.1 to 25 | 0.3 to 10.0 | 99.6 to 65.0 |
| General purpose industrial grade graphite | 0.1 to 25 | 0.3 to 10.0 | 99.6 to 65.0 |
| Premium grade industrial grade graphite | 0.1 to 25 | 0.3 to 10.0 | 99.6 to 65.0 |
| Cabon-graphite alloys | 0.1 to 25 | 0.3 to 10.0 | 99.6 to 65.0 |
| Recrystallized graphite | 0.1 to 25 | 0.3 to 10.0 | 99.6 to 65.0 |
| Pyrolytic graphite | 0.1 to 25 | 0.3 to 10.0 | 99.6 to 65.0 |
| Highly ordered pyrolytic graphite | 0.1 to 25 | 0.3 to 10.0 | 99.6 to 65.0 |
| Ceylon natural graphite | 0.1 to 25 | 0.3 to 10.0 | 99.6 to 65.0 |
| Madagascar natural graphite | 0.1 to 25 | 0.3 to 10.0 | 99.6 to 65.0 |
| Polyfluorinated graphite intercalcates | 0.1 to 25 | 0.3 to 10.0 | 99.6 to 65.0 |
| Solution reacted/reduced molecular sieves*** | 0.1 to 25 | 0.3 to 10.0 | 99.6 to 65.0 |
| Vapor deposited molecular sieves**** | 0.1 to 25 | 0.3 to 10.0 | 99.6 to 65.0 |
| $WF_6$ or $MoFe_6$ graphite intercalates $[C(11 \pm 1)n\ MoF_6$ and $C(14 \pm 1)n\ WF_6]$ | 0.1 to 25 | 0.3 to 10.0 | 99.6 to 65.0 |
| Graphite intercalates of nitric acid $[C_{16}HNO_3, C_{15}HNO_3, C_{24}/C_{25}\ HNC_3$ or $C(8 + 2x)_n\ N_2O_5 \cdot xH_2O]$ | 0.1 to 25 | 0.3 to 10.0 | 99.6 to 65.0 |
| Graphite intercalates of trifluoromethanesulfonic acid $[C_{26} + CF_3SO_3^- \cdot 1.63\ CF_3SO_3H]$ | 0.1 to 25 | 0.3 to 10.0 | 99.6 to 65.0 |
| Graphite intercalates of sulfuric acid $[C_{24} + HSO_4^- \cdot xH_2SO_4$ where $x = 2.37$ to 2.63] | 0.1 to 25 | 0.3 to 10.0 | 99.6 to 65.0 |
| Graphite intercalates of metal chlorides [e.g. $Cn\ FeCl_{(3-x)}, C_{26}FeCl_3, C_{24}\ FeCl_2$, where metal chlorides can be $MoCl_5, MnCl_2, FeCl_3, FeCl_2, CoCl_2, NiCl_2, CuCl_2]$ | 0.1 to 25 | 0.3 to 10.0 | 99.6 to 65.0 |
| Graphite intercalates of alkali metals and metal chloride solvent complexes $[Li_3CmFeCl_3\ Tetrahydrofuran)_3]$ | 0.1 to 25 | 0.3 to 10.0 | 99.6 to 65.0 |
| Graphite intercalates of mixed metal chlorides and bromides $[C_{13.2}\ TlCl_{1.8}Br_{1.7}, C_{30}TlBr3.4]$ | 0.1 to 25 | 0.3 to 10.0 | 99.6 to 65.0 |
| Graphite intercalates of metal bromides $[C_{25.3}\ TlBr_{3.2} \cdot Br_2\text{-}TlBr_3$, where other metal bromides may be $CdBr_2, HgBr_2, AlBr_3$ and $GaBr_3]$ | 0.1 to 25 | 0.3 to 10.0 | 99.6 to 65.0 |
| Graphite intercalates of alkali metals and benzene $\{MC_{24}(C_6H_6)x$ or $KC_{24}(C_6H_6)x\}$ | 0.1 to 25 | 0.3 to 10.0 | 99.6 to 65.0 |
| Simple graphite intercalates of alkali metals $[LiC_6, KC_8$, etc. or $KC_{24}, LiC_{12}, KC_{36}]$ | 0.1 to 25 | 0.3 to 10.0 | 99.6 to 65.0 |
| Graphite intercalates of boron trifluoride $[Cn\text{-}OC_2H_5 \cdot xBF_3]$ | 0.1 to 25 | 0.3 to 10.0 | 99.6 to 65.0 |
| Graphite-antimony pentafluoride intercalate $[Cx \cdot SbF_5]$ | 0.1 to 25 | 0.3 to 10.0 | 99.6 to 65.0 |
| Layer intercalated dicholcoginides $[L1TiS_2, TaCs(NH_3)]$ | 0.1 to 25 | 0.3 to 10.0 | 99.6 to 65.0 |
| $MoS_2$ intercalation compounds $[A_xMoS_2$ where $A = Na, K,$ | 0.1 to 25 | 0.3 to 10.0 | 99.6 to 65.0 |

TABLE 2-continued

| Metal/Non-Metallic Filler* | Range of Compositions | | |
|---|---|---|---|
| | Weight/Percent Composition | Weight/Percent Binder** | Weight/Percent Vehicle |
| Rb, Cs, Ca, and Sr] Metal oxide lamellar intercalation compounds [AxMO2 where A = Na, K, etc. and M = Cr, Mn, Co] | 0.1 to 25 | 0.3 to 10.0 | 99.6 to 65.0 |

*600 mesh or smaller particle size
**based on solids content
***reacted with salt of nickel, gold, platinum, paladium, iridium, silver, or alloys of each
****noble metals, silver, or alloys of each Since most coatings or impregnant must be processed onto or into the filter media, a vehicle, such as a solvent, must be used to allow the coating to form a homogeneous film or to penetrate the filter media fibers. Table 3 lists preferred vehicles.

TABLE 3

$H_2O$
$H_2O/NaOH$, $Ca(OH)_2$, KOH
$N_2H_4/H_2O$
Isopropanol (IPA)

TABLE 3-continued

Ethanol (E)

Accordingly, a typical coating formulation container a "binder" (from Table 1), a vehicle (i.e., Tables 3), or a filler agent (from Table 2) may be applied to, or impregnated into matrix fibers, to impart the inventive properties thereto, and yield the improved filter, and such typical formulations are set out in Table 4.

TABLE 4

| Formulation number | Filler* | | Binder* | | Vehicle*** | | Surfactants | |
|---|---|---|---|---|---|---|---|---|
| | Type | W/O | Type | W/O* | Type | W/O | Type | W/O |
| 1 | Ti C** | 15.0 | PMEA-1 | 7.0 | IPA | 85.0 | — | — |
| 2 | Graphite*** | 6.0 | PMMA-1 | 6.8 | MC | 94.0 | — | — |
| 3 | BaC** | 11.0 | SMS-1 | 5.0 | $H_2O$/NaOH | 89.0 | SF1066**** | 0.01 |
| 4 | Stainless steel** | 2.0 | PA-1 | 25.0 | NMDF | 98.0 | — | — |
| 5 | Silver on graphite ** | 25 | EP-1 | 10.0 | THF | 75 | — | — |
| 6 | Polyfluorinated graphite intercalate *** | 20 | TFE | 80 | (none) | | (flame sprays after cold blending with sintering at 500° F.) | |
| 7 | $KC_{24}(C_6H_6)x$ | | TFE and graphite | 35 | Freon-111 | 65 | — | — |
| 8 | $Cx . SbF_5$ | | TFE and graphite | 10 | Freon-111 | 90 | — | — |
| 9 | $Li_3CnFeCl_3$ (tetramethylene oxide) | | TFE and graphite | 30 | THF | 70 | — | — |
| 10 | $C_{13.2}TlCl_{1.8}Br_{1.7}$ | | TFE and graphite | 25 | Freon-111 | 75 | — | — |

*see Table 2;
**see Table 1;
***see Table 3 (the term "vehicle" is the terminology for a solvent or solvent mixture that allows film formation in a coating by evaporative loss cross-linking, or emulsion formation);
****trademark of the General Electric Co. for its polyalkylene glycol siloxane

*Based on solids content after vehicle evaporation
**600 mesh or less, dried
***Northern Michigan or Canadian graphite highly ordered or pyrolytic graphite - 1000 mesh or less Isopropanol and water (IPA + $H_2O$)
Tetrahydrofuran (THF)
N,N'-dimethyl formamide (NNDF)
Acetone (ACE)
Methyl ethyl ketone (MEK)
Freon solvents (FR)
Carbitol ⎫
Cellosolve ⎬ polygycol ethers
Propasol ⎭
Methyl isobutyl ketone (MIBK)
Methylene chloride (MC)
2,2,2 Trifluoroethanol (2-TFE)
1,1,1,3,3,3, Hexafluoro-2-propanol (1-3-HFP)
Cyclohexane (CH)
$H_2O$ + amonic and/or cationic surfactants (HS)
Toluene (Tol)
Benzene (Ben)
Methanol (M)

Formulations numbers #1 through #5 are intended for purposes of accommodating gas stream component release, as priorly described. Formulation #2 and other polytetrafluoroethylene (Table 1) and polyfluoroethylene propylene unfilled coatings impart "self-cleaning" and corrosion protection, while formulations #6 through #10, as well as graphite intercalates of boron trifluoride act a gettering agents (e.g., polymerization of polyvinyl chloride monomer to a polymerized state to remove the monomer from a process gas stream).

The media of the filter matrix to be coated can be made from treated cellulostics, glass, pyroceramic or ceramic fibers, minerals of various types, metals or preoxidizing of calorized or plated metals, polymeric materials, and polymer composites, as described previously.

In our preferred embodiment, the matrix is prepared from a filter media material comprising a compound of polyethylene and ketjenblack-EC (the trademark for an electrical conductive carbon black manufactured by the Noury Chemical Company, New York). Typically, the constituent elements are cold blended and extruded into fibers, or formed by explosive reticulation techniques. The extruded or otherwise formed fibers are then woven, compressed or hand layed-up into a desired filter configuration. Simply by adjusting the amount of fiber "filler", i.e., the ketjenblack-EC, it is possible to alter the component (i.e, to-be-filtered-out particles, etc.)-to-media adhesion. That is, differences in the net component (particle)-media volume resistivity, and the net overall volume resistivity of the media surface and/or the fibers, to determine the amount of energy which will be required to break or neutralize the forces of attraction between the components (particles) and media, can be effected by the *filler* content. Ketjenblack-EC is but one filler which may be used for this purpose, and is mentioned, here, only for exemplary purposes. Other suitable fillers are listed in Table 2.

As noted priorly, various polymeric materials may be used as filter media fibers or material. Table 5 lists polymeric materials that may act as filter media matrices for which other and various fillers are added to alter the properties of the media.

TABLE 5

| Generic name | Common name |
|---|---|
| Polymethyl siloxane | silicone |
| Polymethyl vinyl siloxane | silicone |
| Polyphenyl methyl siloxane | silicone |
| Polytetrafluoroethylene | Teflon (tm, DuPont), TFE |
| Polymethylmethacrylate | Lucite (tm, DuPont) acrylic |
| Polyacrylic acids | — |
| Acrylonitrile-butadiene polystyrene | ABS |
| Alkyd polymers | alkyds |
| Polyamides | Nylon 6, 6/6, 11, 12,6/10 |
| Polyimides | Vespel (tm, DuPont) |
| Polyamide-imides | Torlon (tm, Amoco Chemical) |
| Cellulosics | cellulose nitrate, - acetate butyrate, ethyl cellulose modified with urea, alkyd, and other resins |
| Epoxy polymers | glycidyl ethers of bis-hydroxy phenyl propane catalyzed with mono-, di-, or trifunctional amines or phenolic or amino resins |
| Polyfluoroethylene propylene | FEP resins (DuPont) |
| Unsaturated polyester polymers | Linear alkyd having carbon to carbon unsaturation |
| Polyphenylene sulfide | RYTON (Phillips Petroleum) |
| Polyolefins | polyethylene, polypropylene etc. |
| Chlorosulfonated polyethylene | HYPALON (DuPont) |
| Polyphenylene oxide polymers | VALOX (G. E.) |
| Polycarbonate polymers | LEXAN (G. E.) |
| Polyphenylene | — |
| Polyarylsulfones | — |
| Polyurethane | polyester or polyether types mono-methyl - or trimethyl diisocegente |
| Polyparaxylene | PARALIN |

These polymeric materials may also contain filler agents which will modify their physical properties in such a fashion as to control gas stream component impaction-retention, modify surface specific resistivity, and provide a relatively easy means for component release from the filter matrix with the introduction of mechanical, or other, energy forms. Filler agents for the listed polymeric materials, and concentration ranges therefor, are listed in Table 6.

TABLE 6

| Metal/Non-Metallic Filler** | Filter (phr)* | Binder or Matrix (phr) |
|---|---|---|
| Stainless steel powder, type 300 & 400 series, 17-4 PH etc. | 1.0 to 350 | 100 |
| Silver plated nickel (6 to 20 w/o silver on nickel) | 1.0 to 350 | 100 |
| Silver plated carbon (1 to 13 w/o silver on carbon) | 1.0 to 350 | 100 |
| Silver plated graphite (1 to 16 w/o silver on graphite; see Table 2 for types of graphite) | 1.0 to 350 | 100 |
| Iridium plated graphite (0.5 to 6 w/o silver on graphite; see Table 2 for types of graphite) | 1.0 to 350 | 100 |
| Aluminum-zinc (40:60) | 1.0 to 350 | 100 |
| Chromium-nickel (55:45) | 1.0 to 350 | 100 |
| Copper-chromium (99:1) | 1.0 to 350 | 100 |
| INCONEL 600(1) | 1.0 to 350 | 100 |
| Titanium aluminum (65:35) | 1.0 to 350 | 100 |
| Zirconium nickel (70:30) | 1.0 to 350 | 100 |
| Titanium carbide | 1.0 to 350 | 100 |
| Noury ketjenblack-EC(tm) | 1.0 to 350 | 100 |
| Boron carbide | 1.0 to 350 | 100 |
| Columbium (niobium) carbide | 1.0 to 350 | 100 |
| Tantalum carbide | 1.0 to 350 | 100 |
| Tungsten titanium carbide | 1.0 to 350 | 100 |
| Zirconium carbide | 1.0 to 350 | 100 |
| Petroleum coke base carbon | 1.0 to 350 | 100 |
| Anthracite coal base carbon | 1.0 to 350 | 100 |
| General purpose industrial grade graphite | 1.0 to 350 | 100 |
| Carbon-graphite alloys | 1.0 to 350 | 100 |
| Premium grade industrial grade graphite | 1.0 to 350 | 100 |
| Recrystallized graphite | 1.0 to 350 | 100 |
| Pyrolytic graphite | 1.0 to 350 | 100 |
| Highly ordered pyrolytic graphite (HOPG) | 1.0 to 350 | 100 |
| Ceylon natural graphite | 1.0 to 350 | 100 |
| Madagascar natural graphite | 1.0 to 350 | 100 |
| Polyfluorinated graphite intercalates | 1.0 to 350 | 100 |
| Solution reacted/reduced*** molecular sieves (1Å to 20Å pore sizes) | 1.0 to 350 | 100 |
| Vapor deposited molecular sieves (1Å to 20Å pore sizes) | 1.0 to 350 | 100 |
| $C(1.1 \pm 1)_n$ $MoF_6$ or $C_{(14 \pm 1)n}$ $WF_6$ graphite intercalates | 1.0 to 350 | 100 |
| Graphite intercalates of nitric acid (see Table 2) | 1.0 to 350 | 100 |
| Graphite intercalates of trifluoromethanesulfonic acid (see Table 2) | 1.0 to 350 | 100 |
| Graphite intercalates of sulfuric acid (see Table 2) | 1.0 to 350 | 100 |
| Graphite intercalates of metal chlorides (see Table 2) | 1.0 to 350 | 100 |
| Graphite intercalates of alkali metals and metal chloride solvent complexes (see Table 2) | 1.0 to 350 | 100 |
| Graphite intercalates of mixed metal chlorides and bromides (see Table 2) | 1.0 to 350 | 100 |
| Graphite intercalates of metal bromides (see Table 3) | 1.0 to 350 | 100 |
| Graphite intercalates of alkali metals and benzene (see Table 2) | 1.0 to 350 | 100 |
| Simple graphite intercalates of alkali metals (see Table 2) | 1.0 to 350 | 100 |
| Graphite intercalates of boron trifluoride (see Table 2) | 1.0 to 350 | 100 |
| Graphite-antimony penta-fluoride intercalates (see Table 2) | 1.0 to 350 | 100 |
| Layer intercalated dihalogenides (see Table 2) | 1.0 to 350 | 100 |
| $MoS_2$ intercalation compounds (see Table 2) | 1.0 to 350 | 100 |
| Metal oxide lamellar intercalations | 1.0 to 350 | 100 |

TABLE 6-continued

| Metal/Non-Metallic Filler** | Filter (phr)* | Binder or Matrix (phr) |
|---|---|---|
| (see Table 2) | | |

*phr: parts per hundred resin or polymer binder.
(¹)registered trademark for an austenitic high nickel alloy manufactured by the International Nickel Corp., Tuxedo, New York While we have described our invention is connection with specific embodiments thereof it is to be clearly understood that this is done only by way of example and not as a limitation to the scope of the invention as set forth in the objects thereof and in the appended claims.

We claim:

1. An improved absolute, fluid filter, for removing components such as particulate materials, particulate-aerosol combinants, sublimated solids, and the like, from gas streams, said filter having a matrix formed from one material taken from a group of materials consisting of treated paper, glass, and mineral fibers, polymeric fibers, and cellulostic fibers, wherein the improvement comprises:
    means coating said matrix material, and hardening, strengthening, and toughening said matrix material, for enhancing components-release from said filter, whereby said filter is rendered cleanable and resuable; and said matrix material comprises a filter medium formed of fibers which latter fibers are formed of a compound of a polymer and a filler agent.

2. An improved absolute, fluid filter, according to claim 1, wherein:
    said coating means further comprises means for altering the physical properties of the surface of said matrix material, to reduce impaction-retention of said components by said matrix material.

3. An improved absolute, fluid filter, according to claim 1, wherein:
    said coating means further comprises means for reducing electro-static attraction of said matrix material for said components.

4. An improved absolute, fluid filter, according to claim 1, wherein:
    said coating means further comprises means for increasing diffusion capacity of said matrix material.

5. An improved absolute, fluid filter, according to claim 1, wherein:
    said coating means further comprises means for imparting corrosion protection to said filter matrix.

6. An improved absolute, fluid filter, according to claim 1, wherein:
    said filler agent comprises carbon black, and said polymer comprises polyethylene.

7. An improved absolute, fluid filter, according to claim 1, wherein:
    said filler agent comprises a graphite intercalate, whereby said graphite intercalate comprises means for gettering carcinogenic and like harmful vapors and/or particulates borne by said gas streams by altering said carcinogenic and like vapors and/or particulates chemical reactivity or changing the chemical structure thereof.

8. An improved absolute, fluid filter, for removing components such as particulate materials, particulate-aerosol combinants, sublimated solids, and the like, from gas streams, said filter having a matrix formed from a material taken from a group of materials consisting of treated paper, glass, and mineral fibers, ceramic fibers, polymeric fibers, and cellulostic fibers, wherein the improvement comprises:
    means coating said matrix material, and hardening, strengthening, and toughening said matrix material, for enhancing components-release from said filter, whereby said filter is rendered cleanable and reusable; wherein
    said coating means comprises a filler agent; and
    said filler agent comprises means for gettering carcinogenic and like harmful vapors and/or particulates borne by said gas streams by altering said carcinogenic and like vapors and/or particulate chemical reactivity or changing the chemical structure thereof.

* * * * *